United States Patent [19]

Someya et al.

[11] Patent Number: 4,897,531

[45] Date of Patent: Jan. 30, 1990

[54] DATA IDENTIFYING SYSTEM

[75] Inventors: Hiromi Someya, Kawasaki; Yasushi Kuramoto, Yokohama, both of Japan

[73] Assignee: Canon Kabushiki Kaisha, Tokyo, Japan

[21] Appl. No.: 148,752

[22] Filed: Jan. 26, 1988

[30] Foreign Application Priority Data

Jan. 30, 1987 [JP] Japan ........................ 62-19923

[51] Int. Cl.[4] ........................ G06K 7/00

[52] U.S. Cl. ........................ 235/440; 235/448; 235/474

[58] Field of Search ........................ 235/440, 448, 474

[56] References Cited

U.S. PATENT DOCUMENTS 4,628,195 12/1986 Baur ........................ 235/440

4,678,896 7/1987 Carlson ........................ 235/440

*Primary Examiner*—Harold I. Pitts

*Attorney, Agent, or Firm*—Fitzpatrick, Cella, Harper & Scinto

[57] ABSTRACT

A data identifying system for identifying information recorded in a recording medium comprises: a discriminable card like a credit card having a magnetic stripe; a memory medium like an optical ROM card having an accident card list in which data regarding invalid cards (accident cards) is stored; a first reading unit to read the data stored in the memory medium; a discriminating circuit to discriminate whether the card is invalid or not on the basis of an output of the reading unit; a circuit to inform the fact that the card is invalid when it is decided to be invalid; and a second reading unit to read the data recorded on the card.

19 Claims, 8 Drawing Sheets

DATA IDENTIFYING SYSTEM

BACKGROUND OF THE INVENTION

1. Field of the Invention

The present invention relates to a system for identifying information recorded in a recording medium.

2. Related Background Art

In recent years, with the advancement of a tendency toward a cashless lifestyle, the number of credit cards has increased more and more until the number of kinds of the cards has reached about two thousand. The number of cards issued is a hundred million or more. In association with the increase in the number of cards, the number of crimes of the cards due to the "illegal use" in which another person illegally uses a credit card which was stolen or lost is also rapidly increasing.

As the most advanced system at present to check the card which was used in the "illegal use" as mentioned above, there is a CAT (credit authorization terminal). The CAT is installed in a card member store. When a customer makes purchases or the like using his card in a card member store, the content (credit company, member number, effective period of the member card, and the like) of the card is read by the terminal on the card member store side, thereby directly checking the card with the accident card list (black list) of the card company by use of a telephone line. It takes about forty seconds for the communication time and search time. In this case, not only must the customer wait and an unpleasant feeling is given to him, but also the cost of installation is needed and the communication fee is necessary every check.

On the other hand, if a credit card was lost or stolen, by reporting this fact to the card company and the police station, it is listed in "Accident Card List" which is issued once or twice a month and this list is delivered to the member stores. Namely, even if the CAT is installed, such an illegal card can be checked by observing this list. However, the number of accident cards is about sixty to seventy thousand and it is also necessary to perform several other checks in the member store.

For example, a customer makes purchases in the card member store by use of the card in the following procedure.

1. The customer hands a credit card to a store clerk.
2. The clerk checks the effective period of the card.
3. The clerk checks the effective period of the "Accident Card List".
4. The clerk selects the card company of the card given from the customer from the "Accident Card List" and checks whether the member number of this card is listed in this list or not.
5. The clerk imprints the member number or the like of the card on the sales voucher by an imprinter as disclosed in JP Published Gazette No. 1980-12863 (JP Patent Laid-Open No. 1977-46917).
6. The clerk hands the sales voucher to the customer and the customer signs his name on the sales voucher.
7. The clerk checks whether the handwriting of the signature on the sales voucher coincides with that of the signature of the card or not.
8. The clerk hands a copy of the sales voucher and the articles to the customer.

The above-mentioned procedure is the flow when no abnormality is found out with respect to all of the check items. If any abnormality is found out, the clerk must report it to the police station or must inform the customer of the fact that the card is invalid, or the like.

As mentioned above, the number of check items is very large and not only the fatigue of the clerk increases and the mischeck by the clerk may occur but also the sales affairs deteriorate and the service to the customer deteriorates. On the other hand, when the sales amount of money is low, there is a case where the clerk does not check, so that he may erroneously overlook the crime.

SUMMARY OF THE INVENTION

It is an object of the present invention to provide an improved data identifying system which can eliminate the foregoing drawbacks.

Another object of the invention is to provide an offline identifying system and to provide a new excellent accident card list system.

Still another object of the invention is to provide a novel search system using an optical recording medium of a large memory capacity.

Still another object of the invention is to provide a data identifying system having the function to print the data regarding a card.

Still another object of the invention is to provide a data identifying system which can prevent that a card is erroneously decided to be an accident card or that an accident card is erroneously overlooked.

The above and other objects and features of the present invention will become apparent from the following detailed description and the appended claims with reference to the accompanying drawings.

DETAILED DESCRIPTION OF THE PREFERRED EMBODIMENTS

A first embodiment of the present invention will be described in detail hereinbelow with reference to the drawings.

In this embodiment, an explanation will be made with respect to an example in which an optical ROM card is used as the foregoing accident card list which is issued once or twice a month.

The optical ROM card will now be explained. The optical ROM card is a read only optical card on which a recording pattern is copied using a photo engraving technique. A large number of optical ROM cards can be produced at a high speed. This card has a structure such that a nonsilver salt pattern layer and an aluminum (A*l*) reflective film are formed between a substrate and a protective layer. When an electrolysis plating is performed, metal is educed in only the portions where the light was irradiated. These portions are used as recording bits in which information is recorded as binary values consisting of the high reflective portion and low reflective portion. A size of one bit lies within a range from a few micron to ten and a few microns. In general, tens to hundreds of bits (per track) are main-scanned at once in the arranging direction of a line sensor by use of a line sensor such as a CCD or the like for high speed reproduction. The sub-scan is executed in the traverse direction of the racks. After a reproducing head is moved by a predetermined distance in the sub-scanning direction, the reproducing head is relatively moved by a predetermined distance in the direction of the information tracks and the sub-scan is again executed in the traverse direction of the tracks. In a manner similar to the above, by alternately repeating the relative movements of the head in the traverse direction of the information tracks and in the direction of the information tracks a desired number of times, all of the information on the optical card is read out. Namely, the accident card list is recorded as binary information onto the optical ROM card by use of a photo engraving technique. A number of such cards are copied and sent to card member stores. Each card member store installs an identifying system which functions as both an optical card reader, which will be explained hereinafter, and a magnetic card reader to read the information recorded on a magnetic stripe formed on a credit card. By use of this system, an accident card or the like can be easily discriminated or the like.

Figure 1:
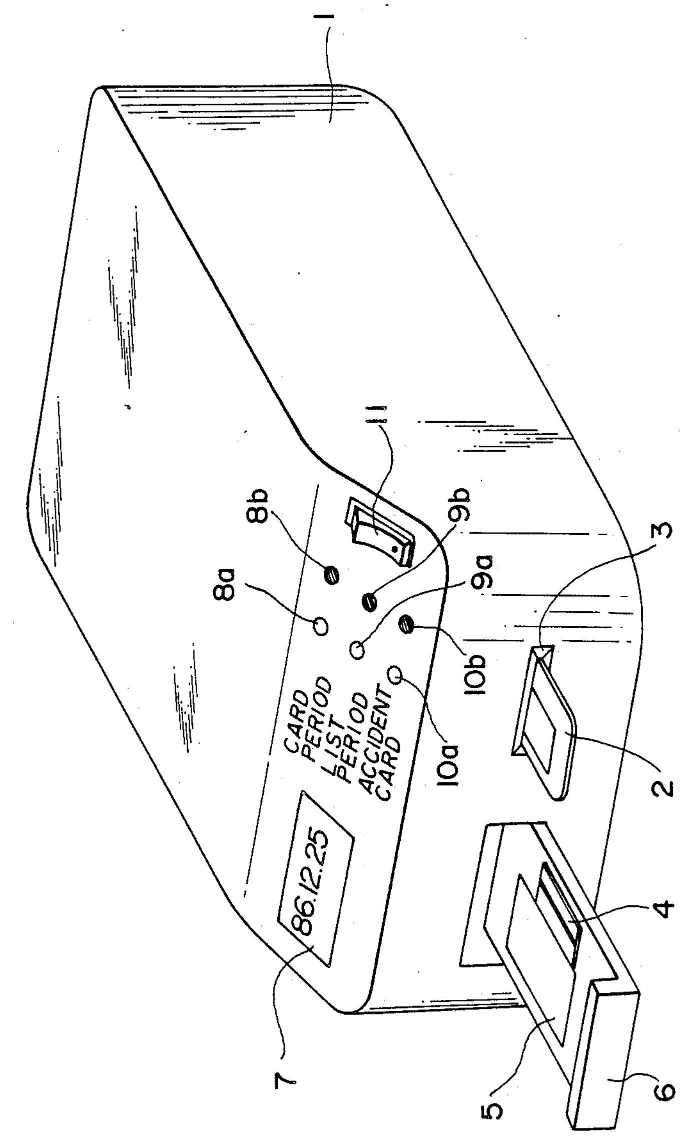
FIG. 1 is an external view of a card identifying system.

FIG. 1 is an external view of a card identifying system with an imprinter in the embodiment. Reference numeral 1 denotes a main body; 2 is an optical ROM card on which an accident card list is recorded; 3 an inlet of the optical ROM card 2; 4 a credit card with a magnetic stripe; 5 a paper to imprint symbols in an emboss portion 4*b* (FIG. 2) of the credit card 4 such as a sales voucher or the like; 6 a tray which is provided in a part of the main body 1 and can be freely pulled out; and 7 a display unit to display the content, e.g., year, month, and day of an auto-calendar provided in the system. Numeral 8*a* and 8*b* denote display elements each consisting of an LED or the like to indicate whether the credit card 4 is out of the effective period (e.g. expired) or not. For example, numeral 8*a* indicates the green LED to indicate that the card is not out of period and 8*b* denotes the red LED to indicate that the card is out of period. Numerals 9*a* and 9*b* denote display elements each consisting of an LED or the like to indicate whether the content recorded on an optical ROM card is out of the effective period or not. Similarly to the LEDs 8*a* and 8*b*, the green LED 9*a* indicates that the recorded content is not out of period and the red LED 9*b* indicates that the recorded content is out of period. Numerals 10*a* and 10*b* denote display elements each consisting of an LED or the like to indicate whether the credit card 4 is listed in the accident card list as the content recorded on the optical ROM card or not. For example, numeral 10*a* denotes the green LED which is lit on to indicate that the member number of the credit card 4 is not listed in the accident card list recorded on the optical ROM card. Numeral 10*b* denotes the red LED which is lit on to indicate that the member number of the credit card 4 is listed in the accident card list. Numeral 11 denotes a power supply switch to supply a power source to each circuit, which will be explained hereinafter.

Figure 2:
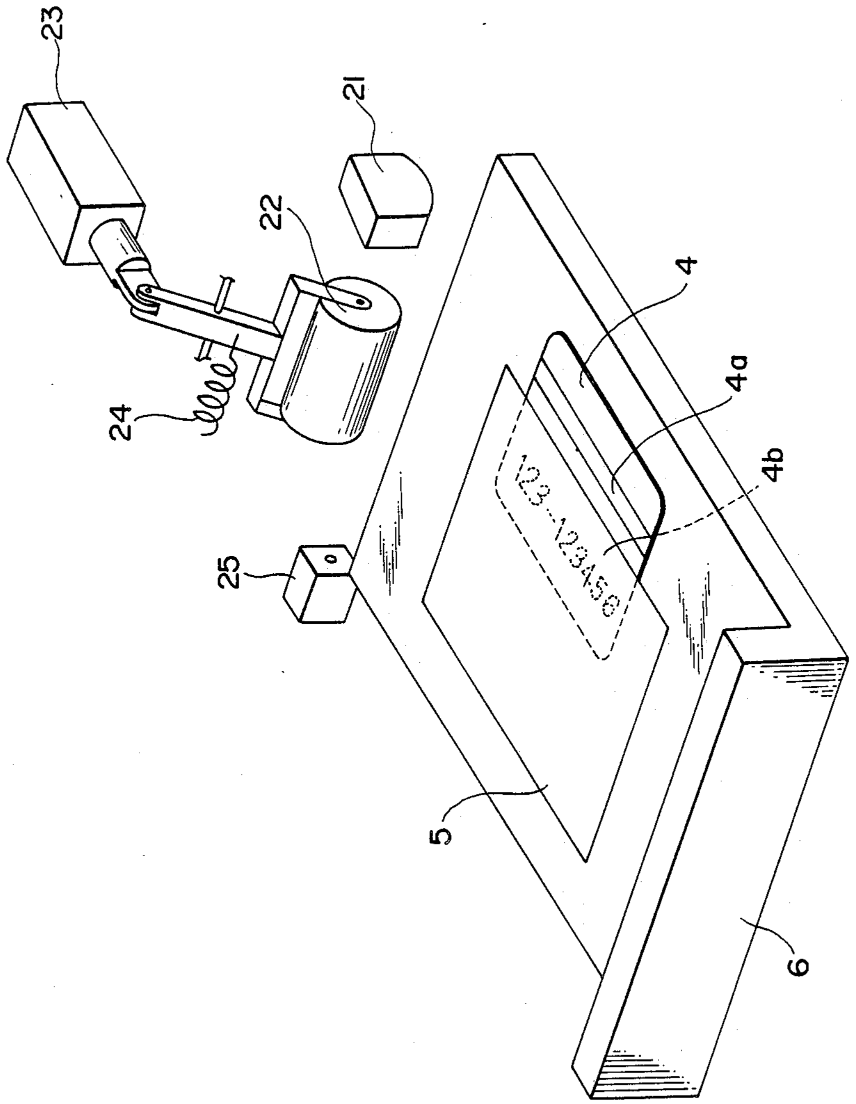
FIG. 2 is a schematic diagram of a magnetic card reading unit.

FIG. 2 is a schematic diagram of a magnetic card reading unit with an imprinter. Since the imprinter is disclosed in detail in the foregoing JP Published Gazette No. 1980-12863, it will be simply described here.

The credit card 4 is put on the tray 6. The paper 5 such as a sales voucher or the like is put on the credit card 4 so as to overlap with the embossed portion 4*b* formed on the card. A magnetic head 21 comes into contact with a magnetic stripe 4*a* formed on the credit card 4 when the tray 6 is pushed into the imprinter, thereby reading the name of card company, member number, effective period of the card, and the like recorded in the magnetic stripe. An ink roller 22 is rotatably axially supported. When the tray 6 is pulled out, the ink roller 22 prints the content of the embossed portion 4*b* of the credit card 4 onto the paper 5. In the ordinary state, i.e., in the inoperative mode, the ink roller 22 is held upward by a spring 24 so as not to come into contact with the paper 5. In the printing mode, by energizing a solenoid 23, the ink roller is set to a predetermined position against the spring 24. A photosensor 25 outputs a detection signal by detecting the position (the edge portion of the tray 6) at which the printing is finished in the pulling-out step of the tray 6.

A method of printing onto the paper 5 is not limited to the foregoing method but it is also possible to print on the basis of the information recorded on the magnetic stripe 4*a*.

Figure 3:
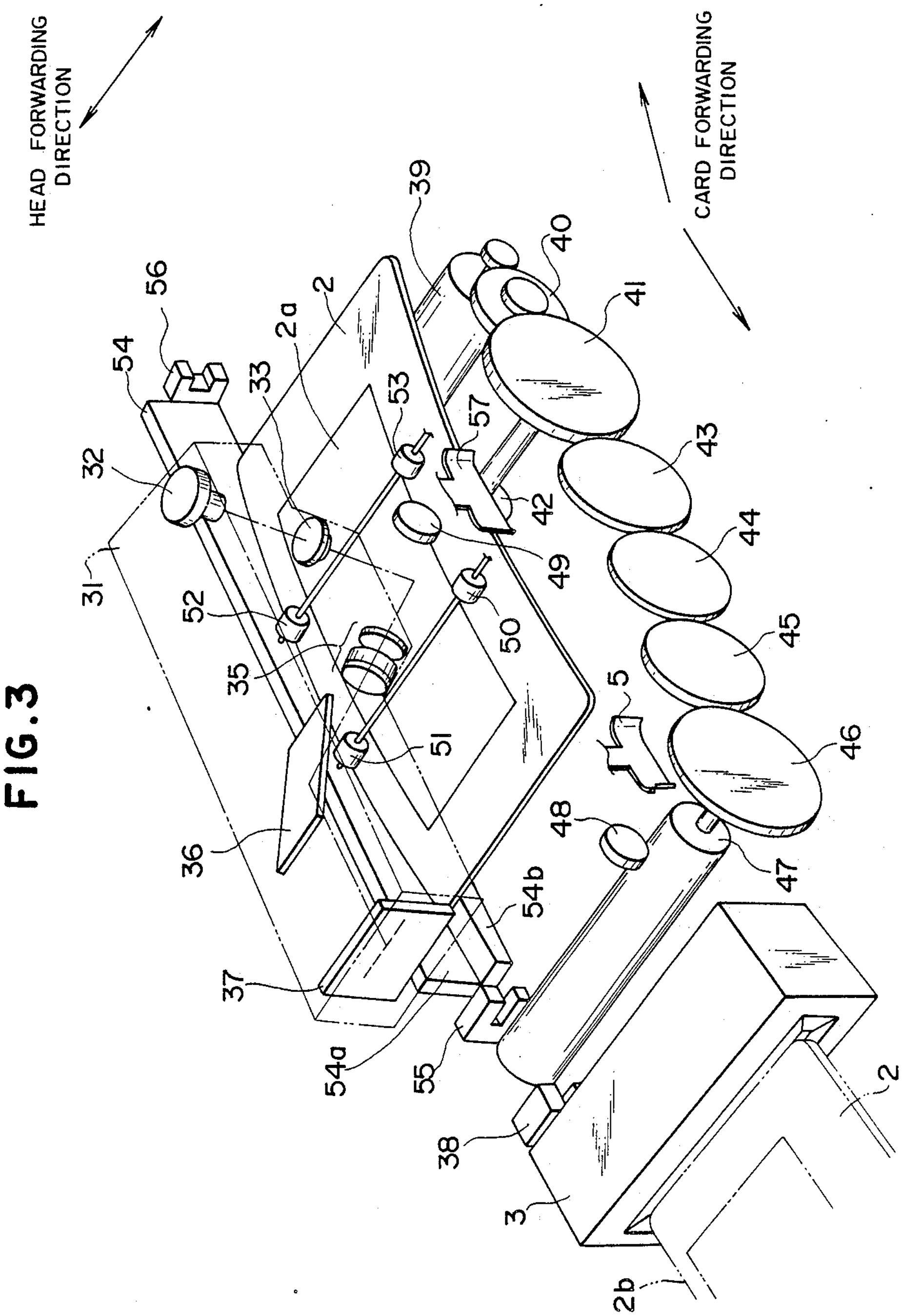
FIG. 3 is a schematic diagram of an optical ROM card reading unit.

FIG. 3 is a perspective view (a head forwarding mechanism is omitted) of the main part in the optical ROM card reading unit. Numeral 31 denotes an optical head body. The head body 31 is covered by a casing made of a die-cast or the like and has therein an illuminating system and an image forming system, which will be explained hereinbelow. Numeral 32 denotes an illuminating light source consisting of an LED or the like and 33 indicates an illuminating optical system to converge the lights emitted from the light source 32 onto an information recording surface 2*a* of the optical card 2. In the case of using an LED as a light source for illumination, a size emitting unit of the LED is ordinarily set to a value of about hundreds of microns and the emitting unit can be regarded as an almost uniform plane light source. Therefore, a certain extent of area (namely, an area including a plurality of information or information tracks) on the information recording surface 2*a* of the optical card 2 can be illuminated by the illuminating optical system 33. The reflected light image from the information recording surface 2*a* illuminated is transmitted through a reflecting mirror 36 and formed onto a line sensor 37 such as a CCD or the like by an image forming optical system 35. The line sensor 37 is constituted by arranging photosensitive elements in parallel with the head forwarding direction. By sequentially scanning (main-scanning) the information in the optically corresponding portion of the information recording surface 2*a*, the line sensor 37 converts the read information into an electric signal. Numeral 38 denotes a card insertion detecting sensor to detect that the optical card 2 has been inserted and to drive a motor 39. The motor 39 propagates the drive force to a drive roller gear 41 through a reduction gear 40, thereby driving a drive roller 42. The drive force is further transferred to a loading roller gear 46 through idler gears 43, 44, and 45, so that a loading roller 47 is driven. Numeral 48 denotes a loading pinch roller 2 which is provided on the loading roller 47 and rotatably axially attached to a card forwarding main body (not shown). The loading pinch roller 48 is urged onto the loading roller 47. Numeral 49 denotes a drive pinch roller which is provided on the drive roller 42 and is rotatably axially attached to the card forwarding main body. The drive pinch roller 49 is urged onto the drive roller 42. The loading pinch roller 48 and drive pinch roller 49 are located on the opposite sides to a reference edge 2*b* of the optical card through the information recording surface 2*a*. Numerals 50, 51, 52, and 53 denote pressing tops which are arranged in parallel with the drive roller 42 through the drive roller 42, respectively. Further, a distance between the forwarding tops in the direction perpendicular to the card surface and the drive roller 42 is narrower than a thickness of optical card 2. These tops are arranged at a position such as to forcedly curve the optical card in the card forwarding direction. When the card is fed, the tops 50 to 53 are located in the outside of the information recording surface 2*a* and are rotatably axially attached to the card forwarding main body. Numeral 54 denotes a guide rail. An inside 54*a* of the rail functions as a slide surface of the reference edge 2*b* of the optical card 2. A slant surface 54*b* is provided along the card forwarding motion. Sensors 55 and 56 for reversing the card forwarding direction are adjacently provided at both ends of the guide rail 54. A leaf spring 57 presses the optical card 2 to the guide rail 54 and is attached at a position such as to press it only when the optical card 2 is out of the information reproducible position.

Figure 4:
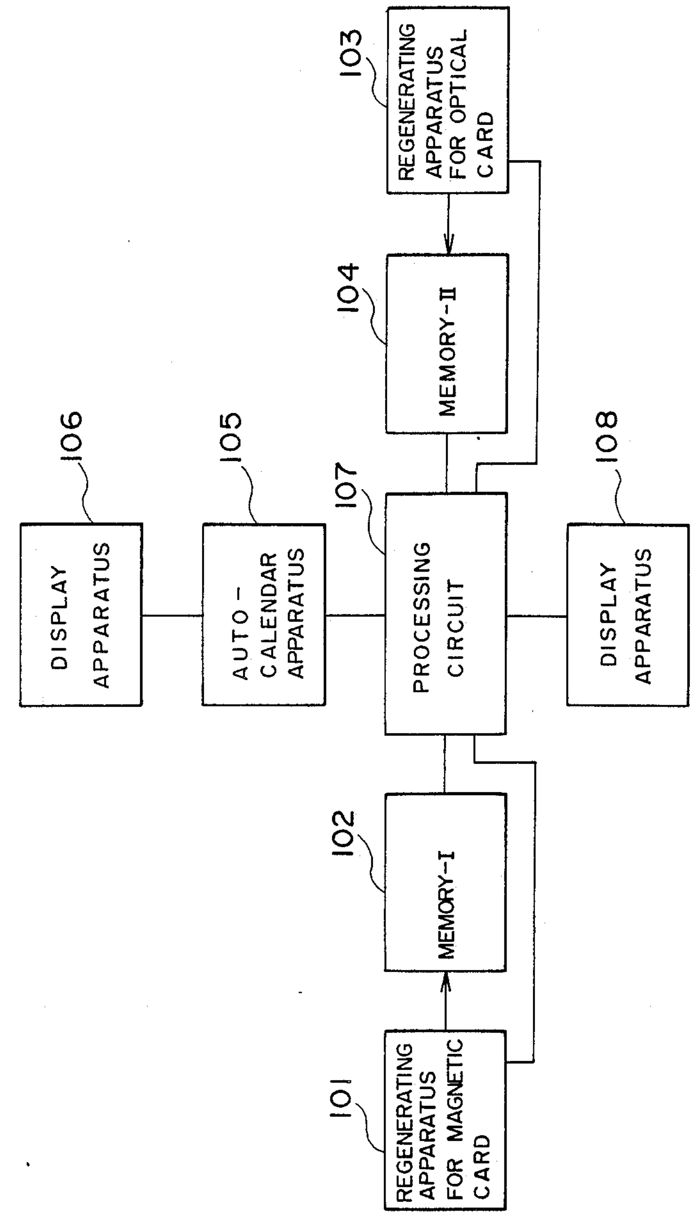
FIG. 4 is a schematic block diagram showing the card identifying system.

FIG. 4 is a block diagram showing a schematic constitution of the system in the embodiment. Numeral 101 denotes a regenerating apparatus for a magnetic card to regenerate the information recorded on a magnetic card put on the tray 6; 102 indicates a memory-I to store the recorded information on the magnetic card which was regenerated by the regenerating apparatus 101; 103 an optical card regenerating apparatus for an optical ROM card on which the accident card list is recorded; 104 a memory-II to store the recorded information which was read; 105 an auto-calendar apparatus which is driven by a back-up battery (not shown); 106 a display apparatus to display year, month, day or the like on the basis of an output from the auto-calendar apparatus 105; and 107 a processing circuit to discriminate the period of the magnetic card, period of the accident card list, accident card, and the like. The processing circuit 107 has therein an ROM in which a processing program is stored. Numeral 108 denotes a display apparatus corresponding to the LEDs 8*a*, 8*b*, 9*a*, 9*b*, 10*a*, and 10*b*.

Figure 5A:
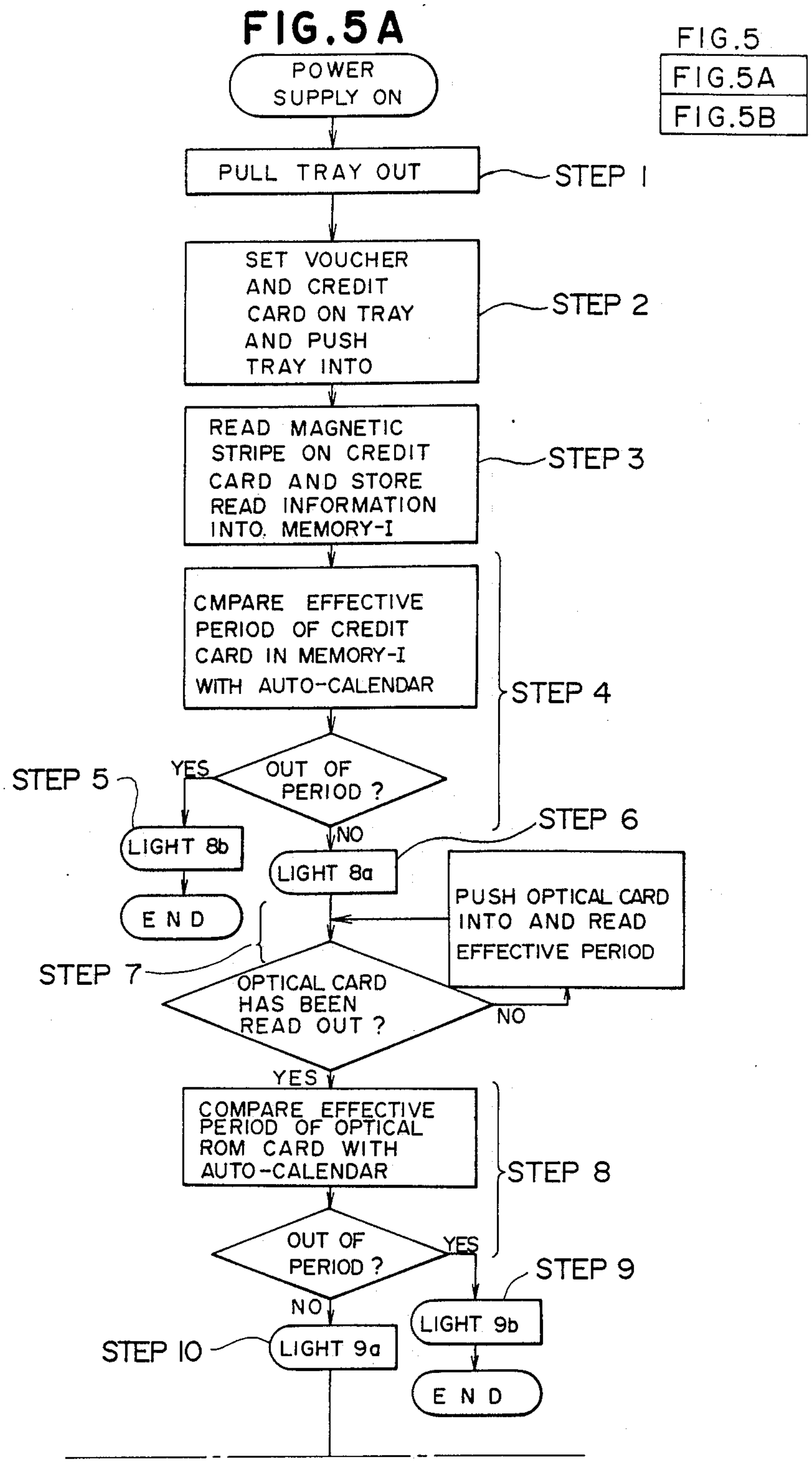
FIGS. 5A and 5B are flowcharts showing the operation of the card identifying system.
Figure 5B:
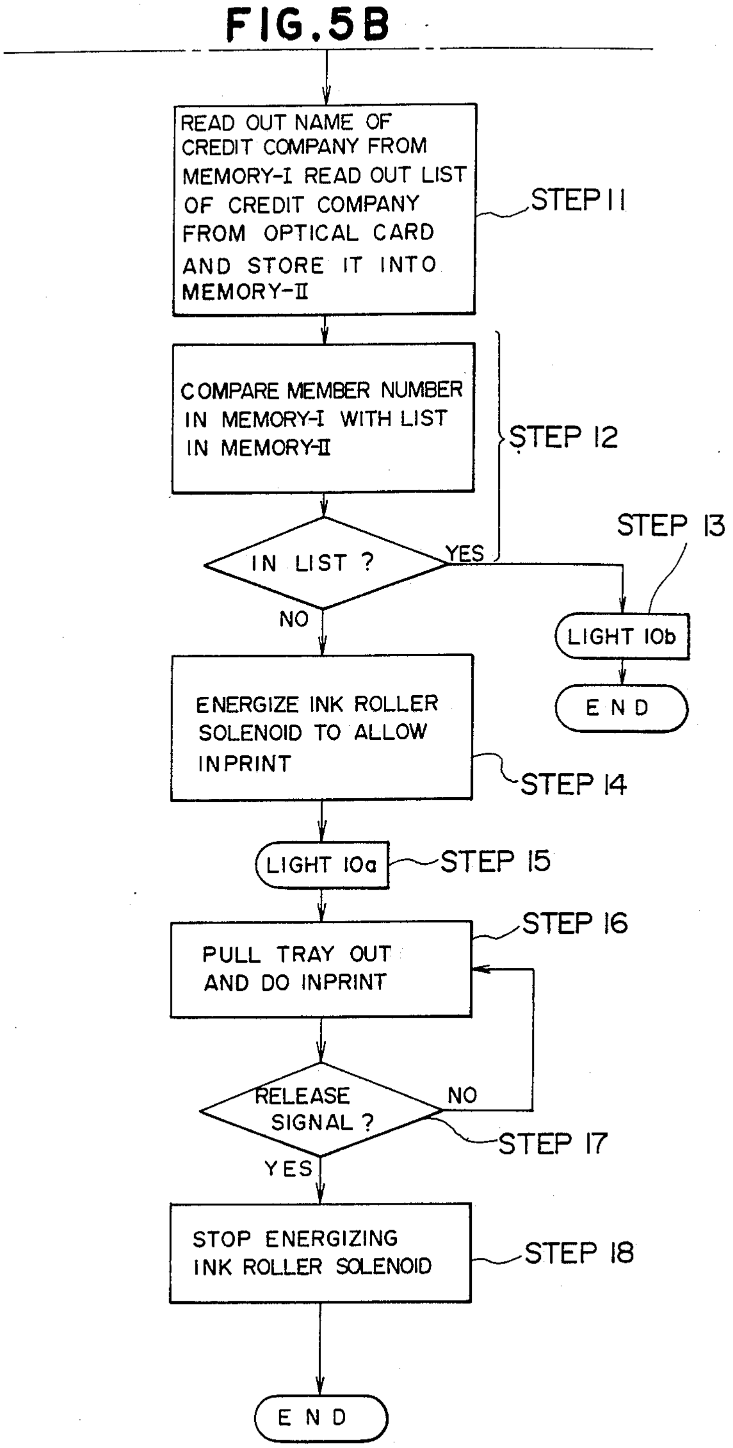

FIG. 5 is a flowchart showing the control operation of the system. The operation will be described with reference to FIGS. 1 to 5.

For example, it is assumed that a customer made purchases in a card member store by use of a credit card. First, the customer hands the credit cart to a store clerk. The clerk receives the credit card and turns on the power source of the card identifying sytem. Next, the tray is pulled out (step 1). The credit card and a sales voucher are set to predetermined positions and the tray is pushed into the system (step 2). In this pushing step, the content recorded in the magnetic stripe of the credit card is read by the magnetic head 21 and stored into the memory-I (step 3). Next, the effective period of the credit card stored in the memory-I is compared with the present data obtained by the auto-calendar function (step 4). If the credit card is out of period, the red LED 8*b* is lit to indicate that the credit card is out of period to the clerk (step 5). The clerk pulls out the tray and takes out the card and informs the customer of the fact that the card is out of period. Next, if the card is within the period, the green LED 8*a* is lit (step 6) to indicate it to the clerk. The clerk confirms this and puts an optical ROM card into the inlet. The optical ROM card is loaded and the portion on the optical ROM card in which the effective period is recorded is read (step 7). This data is compared with the present data obtained by the auto-calendar function (step 8). If the effective period of the optical ROM card is out of period, the red LED 9*b* is lit (step 9), thereby requesting for the clerk to insert another optical card which is within the period. If it is within the period, the green LED 9*a* is lit (step 10) to announce it to the clerk. Next, the name of credit company is read out of the memory-I and the list of the readout company names is read out of the optical ROM card and stored into the memory-II (step 11). Next, the member number is read out of the memory-I and sequentially compared with the list in the memory-II (step 12). If the member number exists in the list, the red LED 10*b* is lit (step 13), thereby informing the clerk of the fact that the credit card is the accident card. The clerk reports this fact to the police station and executes similar processes. At this time, since the energization of the ink roller solenoid is stopped, even if the tray is pulled out, it is not inprinted. If the member number was not found out in the list, the ink roller solenoid 23 is energized, the ink roller is set to the printable position, and thereby enabling the imprint to be performed (step 14). Next, the green LED 10*a* is lit (step 15), thereby informing the clerk of the fact the card is not the accident card. Then, the clerk pulls out the tray. In this case, since the ink roller is moved to the imprint position, the symbol in the emboss portion of the credit card is inprinted onto the sales voucher (step 16). After completion of the inprint, the photosensor 25 detects the edge of the tray and outputs a detection signal (step 17). In response to this output signal, the energization to the ink roller solenoid 23 is stopped (step 18). The ink roller 22 is moved upward by the force of the spring 24. Next, the clerk takes out the sales voucher and credit card from the tray and requests for the customer to sign on the voucher. Then, the clerk compares the sign with the sign written on the credit card. The clerk gives a duplicate of the voucher and credit card to the customer and turns off the power supply switch.

Figure 6:
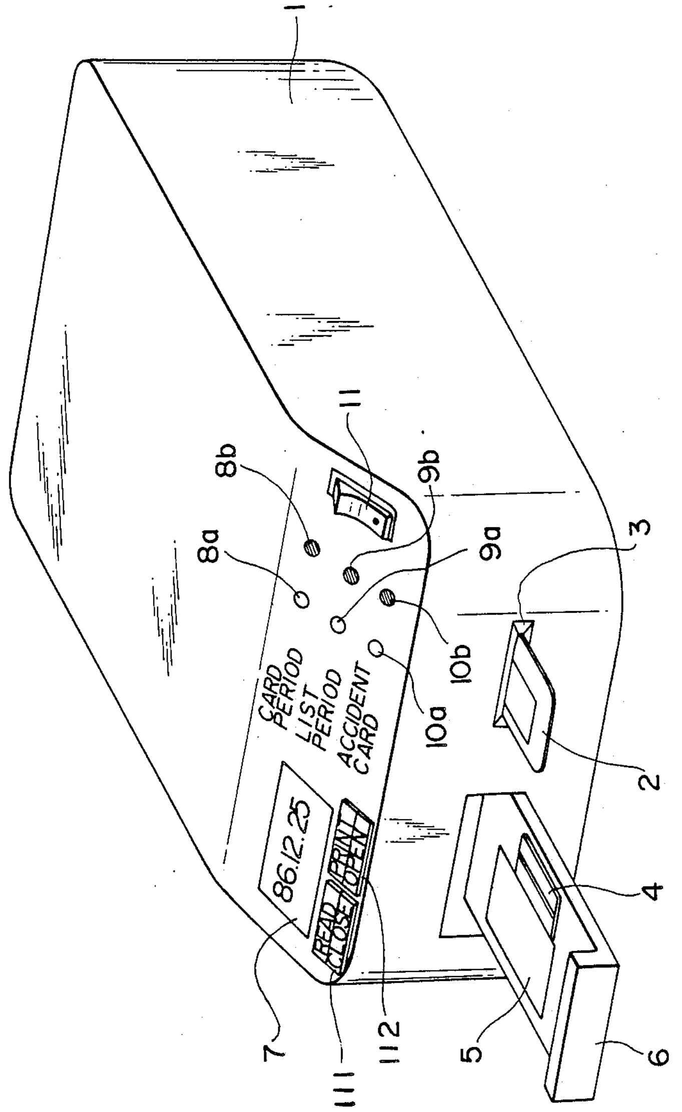
FIG. 6 is a diagram showing another embodiment of a card identifying system.
Figure 7:
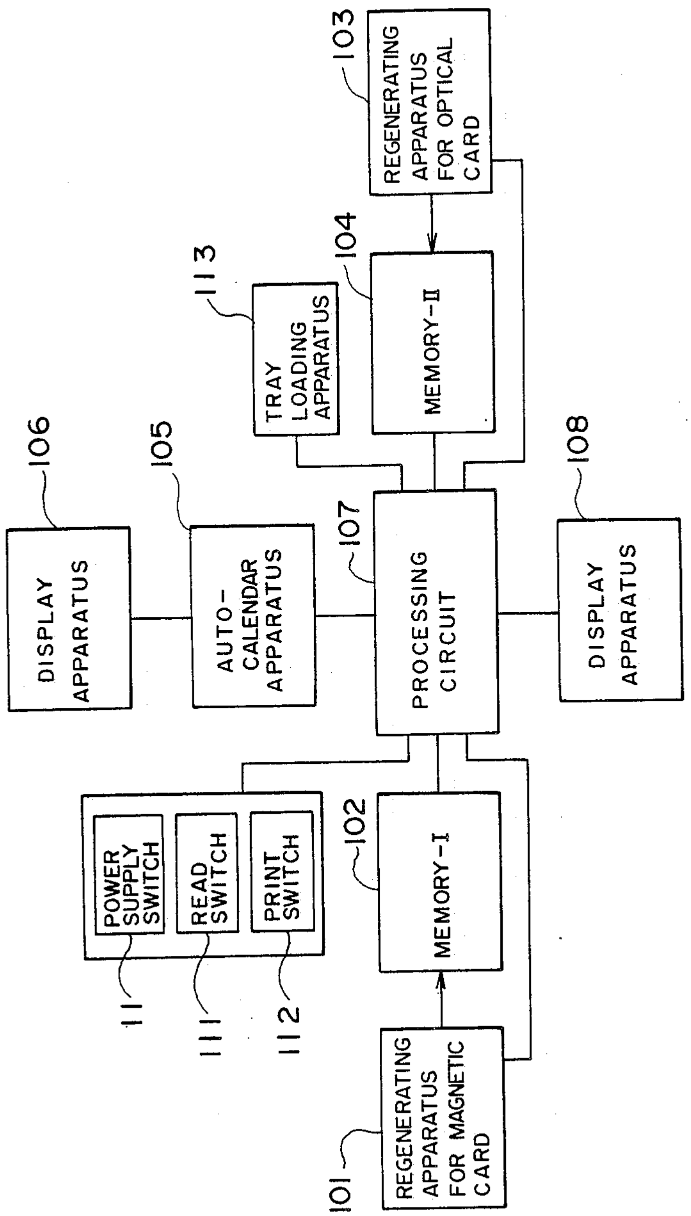
FIG. 7 is a schematic block diagram showing another embodiment of a card identifying system.

FIGS. 6 and 7 are diagrams showing another embodiment of the card identifying system. In the diagrams, the parts and components having the same constitutions as those in FIGS. 1 and 4 are designated by the same reference numerals. Reference numeral 111 denotes a read switch to input a command to read the data recorded on the magnetic card 4 and a command to close the tray 6 and 112 is a print switch to input a command to inprint the emboss portion of the magnetic card and a command to open the tray 6. When the read switch 111 is turned on, the tray 6 is automatically loaded by a tray loading apparatus 113 and at the same time, the data recorded in the magnetic stripe is read by the magnetic head 21. On the other hand, the read switch also functions as a switch to close the tray 6. When the print switch 112 is turned on, the tray 6 is automatically pulled out by the tray loading apparatus 113. When the legal magnetic card which is not the accident card has been inserted, the emboss portion is inprinted. On the other hand, when the power supply switch is turned off, if the tray 6 is open, the power source is turned off after the tray 6 was closed. On the other hand, even if the print switch is not provided, the inprint may be also automatically started after it was confirmed that the credit card is not the accident card.

In this embodiment, the optical ROM card has been used as an information recording medium to record the accident card list. However, it is also possible to use another information recording medium such as CD (compact disc), IC card, or the like in dependence on an amount of information, the number of cards issued, the number of systems installed, or the like. On the other hand, in place of the magnetic stripe card, an IC card or optical card can be also used.

In displaying, the necessary data can be also more easily indicated by use of a display such as liquid crystal, plasma, or the like, or by a voice or the like.

Although the magnetic stripe card has been read by the magnetic head, the clerk can also directly key-input by use of a keyboard or the like.

On the other hand, in addition to the credit card, the invention can be also applied to other cards such as ID cards, membership cards, personal certification cards, tickets, or the like.

As explained above, by providing a timer to output the data in the system, it is possible to automatically check whether the first and second memory media are out of periods or not. Further, the data searching operation in a store is automated. Thus, the fatique or disregard of the clerk is reduced and the service to the customer is improved. Moreover, an unpleasant impression such that the identifying operations are being executed is not given to the customer.

The present invention is not limited to the foregoing embodiments but many modifications and variations are possible within the spirit and scope of the appended claims of the invention.

What is claimed is:

1. An apparatus for comparing identification information recorded on a card comprising:

first reading means for reading out the identification information recorded on said card;

a memory medium which is disengageably mounted in said apparatus and which has stored identification information indicative of an invalid card therein;

second reading means for reading out the identification information from said memory medium;

comparing means for comparing the identification information read out by said first reading means with the identification information read out by said second reading means; and informing means for informing, on the basis of the comparison result, whether a card whose identification information is read out by said first reading means is valid or invalid.

2. A system according to claim 1, wherein said memory medium includes an optical recording medium.

3. A system according to claim 1, wherein said card has a magnetic recording medium.

4. A system according to claim 1, wherein said card includes a credit card.

5. A system according to claim 1, wherein said card includes a personal card.

6. An apparatus according to claim 1, wherein said informing means informs that said card is invalid when the identification information read out by said first reading means coincides with the identification information read out by said second reading means.

7. An apparatus according to claim 1, further comprising generating means for generating date information indicative of date;

second comparing means for comparing the date information generated by said generating means with period information indicative of an effective period of the identification information read out by said second reading means; and second informing means for informing, on the basis of the comparison result of said second comparing means, whether or not the identification information stored in said memory medium is valid.

8. An apparatus according to claim 1, further comprising generating means for generating date information indicative of date;

second comparing means for comparing the date information generated by said generating means with period information indicative of an effective use period of the card whose identification information is read out by said first reading means; and second informing means for informing, on the basis of the comparison result of said second comparing means, whether said card is valid or invalid.

9. An apparatus for comparing identification information recorded on a card comprising:

first reading means for reading out the identification information recorded on said card;

a memory medium which is disengageably mounted in said apparatus and which has stored identification information indicative of an invalid card therein;

second reading means for reading out the identification information from said memory medium;

printing means for printing on a recording material the identification information of said card;

determining means for determining whether the card whose identification information is read out by said first reading means is valid or invalid, on the basis of both the identification information read out by said first reading means and the identification information read out by said second reading means; and control means for controlling said printing means such that said printing means is enabled when said determining means determines that said card is valid and said printing means is disabled when said determining means determines that said card is invalid.

10. A system according to claim 9, wherein said printing means inprints an embossed portion of said card.

11. A system according to claim 10, wherein said printing means has a pressing member to inprint and for the invalid card, said control means allows said pressing member to be moved away from said card and for the valid card, the control means allows the pressing member to press onto said card.

12. A system according to claim 9, wherein said card includes a credit card.

13. A system according to claim 9, wherein said card includes a personal card.

14. A system according to claim 9, wherein said card has a recording medium.

15. A system according to claim 9, wherein said card includes a credit card.

16. A system according to claim 9, wherein said card includes a personal card.

17. A system according to claim 9, wherein said memory medium includes an optical memory medium.

18. An apparatus for comparing identification information recorded on a card comprising:

first reading means for reading out the identification information recorded on said card;

a memory medium which is disengageably mounted in said apparatus and which has stored identification information indicative of an invalid card therein;

second reading means for reading out the identification information from said memory medium;

determining means for determining whether the card whose identification information is read out by said first reading mens is valid or invalid, on the basis of both the identification information read out by said first reading means and the identification information read out by said second reading means;

generating means for generating information indicative of date; and second determining means for determining whether the identification information stored in said memory medium is valid or invalid, on the basis of both period information indicative of an effective period of identification information read out by said second reading means and the date information generated by said generating means.

19. An apparatus according to claim 18, further comprising third determining means for determining whether said card is valid or invalid, on the basis of both period information indicative of an effective use period of said card whose identification information is read out by said first reading means and the date information generated by said generating means.

* * * * *

UNITED STATES PATENT AND TRADEMARK OFFICE
CERTIFICATE OF CORRECTION

PATENT NO. : 4,897,531

DATED : January 30, 1990

INVENTOR(S) : HIROMI SOMEYA, ET AL.

It is certified that error appears in the above-identified patent and that said Letters Patent is hereby corrected as shown below:

AT [57] ABSTRACT

Insert at the end --For example, when any data regarding the card is listed in the accident card list stored in the memory medium, this card is decided to be the accident card. The discriminating circuit discriminates whether the card and optical ROM card are out of effective use periods or not on the basis of the outputs of the first and second reading units. If these cards are out of periods, they are invalid and this fact is informed. With this system, the data identifying operation can be certainly erroneously performed and accidents in the data identification are prevented.--.

COLUMN 3

Line 8, "racks." should read --tracks.--.

COLUMN 4

Line 39, "size emitting unit" should read --size of an emitting unit--.

UNITED STATES PATENT AND TRADEMARK OFFICE

CERTIFICATE OF CORRECTION

PATENT NO. : 4,897,531

DATED : January 30, 1990

INVENTOR(S) : HIROMI SOMEYA, ET AL.

It is certified that error appears in the above-identified patent and that said Letters Patent is hereby corrected as shown below:

COLUMN 9

Line 14, "first reading mens" should read --first reading means--.

Signed and Sealed this

Third Day of September, 1991

Attest:

HARRY F. MANBECK, JR.

Attesting Officer

Commissioner of Patents and Trademarks